July 15, 1941.  M. B. MENTLEY  2,249,252
GEAR FINISHING
Filed Jan. 16, 1939  2 Sheets-Sheet 1

INVENTOR
MAX B. MENTLEY
BY
Whittemore, Hulbert & Belknap
ATTORNEYS

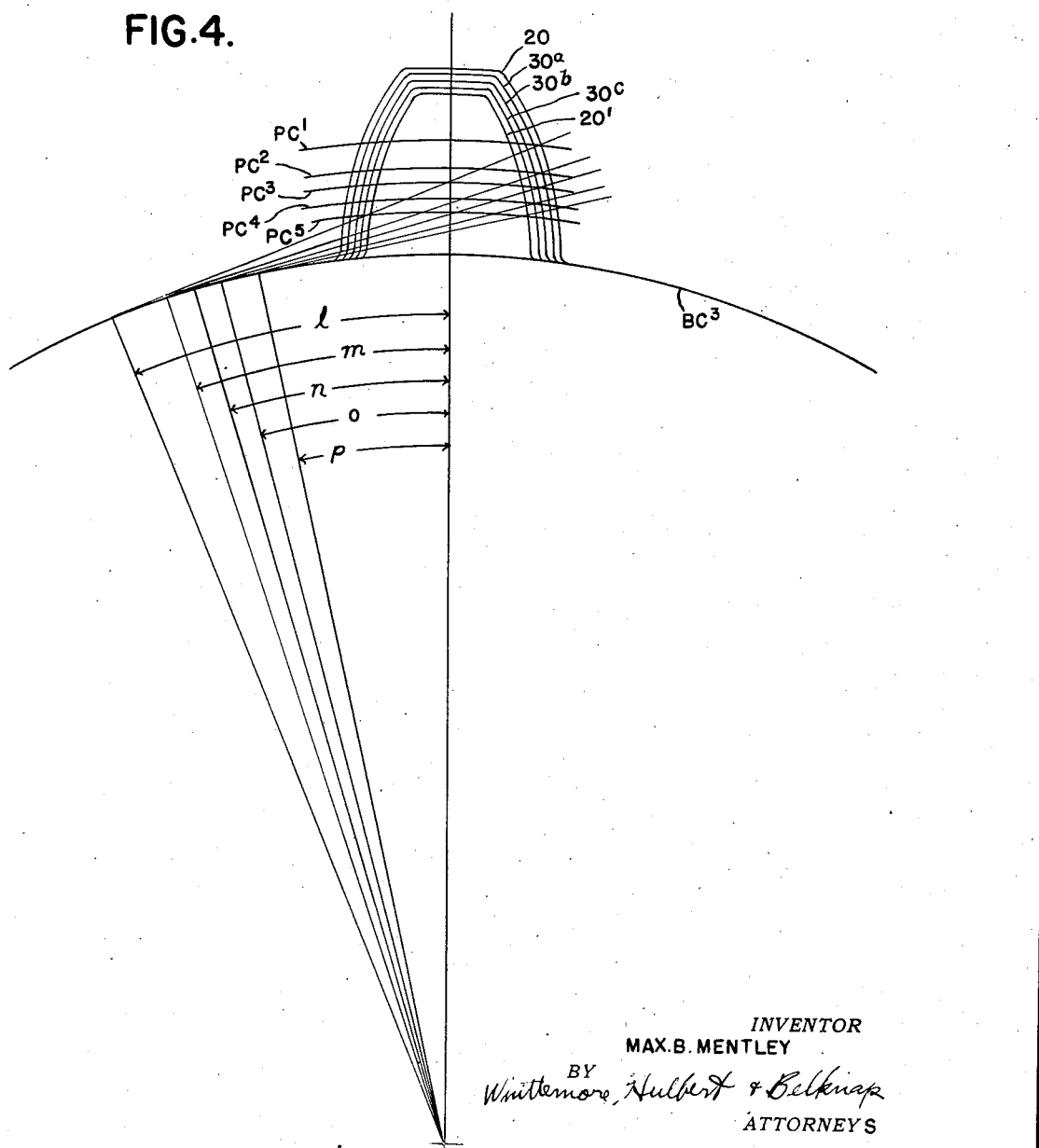

Patented July 15, 1941

2,249,252

UNITED STATES PATENT OFFICE 2,249,252

GEAR FINISHING

Max B. Mentley, Detroit, Mich., assignor to National Broach & Machine Company, Detroit, Mich., a corporation of Michigan Application January 16, 1939, Serial No. 251,253

7 Claims. (Cl. 90—1.6)

The present invention relates to gear finishing and more particularly to a method and tool for accurately finishing the surfaces of involute gears.

It has been proposed in the past to finish the teeth of involute gears by running the gear to be finished in mesh at crossed axes with a rotary finishing tool having teeth conjugate to the teeth of the gear to be finished. The finishing of gear teeth by this method has proved very satisfactory, limits of accuracy being obtained previously approached only by the grinding of the gear teeth.

However, certain difficulties have arisen, particularly in the manufacture of efficient tools, and it is an object of this invention to overcome such difficulties. Involute teeth have the unique property of meshing with other involute teeth conjugate thereto at variable center distances. It is, therefore, possible to provide a gear finishing tool in the form of an involute gear and to mesh the tool with the gear to be finished at different center distances, depending upon the gear characteristics selected for the gear finishing tool. Where the axes of gear and tool are crossed, a variation in center distance necessitates a corresponding change in crossed axes setting.

In the initial development of the gear finishing method previously referred to, it was naturally assumed that a gear finishing tool should conform to the gear to be finished in gear characteristics; that is, it should have such gear characteristics that it would mesh in new condition with the teeth of the gear to be finished at an operating pressure angle substantially equal to the nominal pressure angle of the gear to be finished. To provide additional material on the cutter for resharpening or wear of the tool, the profile was raised, providing tight mesh at increased operating pressure angles.

When finishing gears having a relatively high nominal pressure angle, such as 20° or 22½°, it was found that the method referred to, when practiced with a gear finishing tool adapted to mesh with the gear to be cut substantially at or above the nominal pressure angle, resulted in a tendency for the tool to cut a hollow substantially at the pitch line of the teeth of the gear being cut. At high operating pressure angles, the operating pressures are large, and apparently this results in deflections which introduce errors in the finished gear. This difficulty was originally overcome by providing an arbitrary modification on the profile of the teeth of the cutter, this modification being in the form of a hollow at and adjacent the pitch line of the cutter tooth. This modification of the cutter was effective when the cutter was in new condition. However, it was troublesome and expensive to so modify the teeth of the cutter, and, in addition, it was found that when the cutter was reground so that it engaged the work gear at a substantially reduced operating pressure angle the modified tool produced gears with objectionable tooth profiles.

On gears having a relatively low nominal pressure angle, it is equally desirable to depart substantially from the nominal pressure angle, and it is found that cutters should be designed to operate through substantially the same range of operating pressure angles. There is a lower limit of operating pressure angle which may not be passed, due to the fact that the teeth surfaces too closely approach radial surfaces. I have found that by increasing the operating pressure angle, tool life of these tools for low nominal pressure angle gears may be made as long as in higher nominal pressure angle tools, and at the same time accurate unmodified involute profiles may be obtained.

I have discovered that it is possible to accurately finish involute gears with a gear cutter having an unmodified involute profile throughout the entire useful life of the tool by properly designing a cutter with reference to the gears to be cut. I find that a cutter having teeth which are adapted to mesh with the teeth of a work gear at an operating pressure angle of between 19° and 12° will produce on the teeth of the work gear an unmodified involute profile.

This cutter differs from cutters previously employed in this method of gear finishing in that its teeth are substantially thinner with reference to the base circle than the teeth of the conventional cutter for gears having a nominal pressure angle which is relatively large. For gears having smaller pressure angles, such for example as 12½°, the cutter selected has involute teeth which are substantially thicker relative to the base circle than teeth of cutters previously known to the art. This results in the cutter and the gear meshing at different center distances than would otherwise be the case, and as will be evident results in a departure of the operating pressure angle from the nominal pressure angle of the gear.

It is accordingly an object of the present invention to provide a gear finishing tool having an unmodified tooth profile which is adapted to produce an accurate unmodified involute profile on the teeth of work gears throughout the useful life of the tool.

It is a further object of the present invention to provide a gear finishing tool having gear characteristics such that it will mesh with the teeth of a gear to be cut at an operating pressure angle of less than 19°, and preferably between 19°–15°, when in new condition irrespective of the nominal pressure angle of the gear and cutter.

It is a further object of the present invention to provide a gear finishing cutter of such gear characteristics that it may be employed to finish work gears throughout its useful life and may be reground several times during such life, and at the same time it will engage teeth of the work gear throughout its useful life at an operating pressure angle of between 19° and 12°.

It is a further object of the present invention to finish gear teeth by a method which comprises: running the gear in mesh with a gear finishing tool at an operating pressure angle of between 19° and 12° irrespective of the nominal pressure angle of the gear.

It is a further object of the present invention to finish involute gears with a gear-like tool in crossed axes relationship, regrinding the tool, thereby reducing the operating pressure angle, and effecting a corresponding change in the crossed axes setting of the gear and tool.

Other objects of the invention will be apparent as the description proceeds and when taken in conjunction with the accompanying drawings, and wherein:

Fig. 4 is a diagrammatic view showing the variation in pressure angle resulting from the practice of the present method.

The present invention is applicable to rotary finishing tools of the type disclosed in Patent No. 2,126,178, granted to Robert S. Drummond, dated August 9, 1938. It is also applicable to well known rack types of gear finishing tools. In the present application I have chosen to illustrate the rotary type of cutter, but it will be understood that the rack type cutter may be constructed in like manner. The rack type cutter, of course, has teeth having straight profiles and the theory of operation of this type of cutter is more readily evident than for the rotary type.

Figure 1:
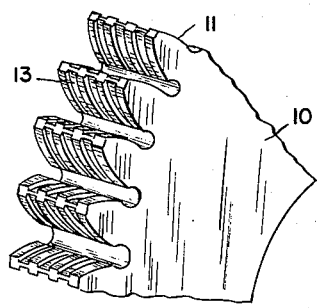
Fig. 1 is a fragmentary view of a rotary cutter of the type employed in the present invention.

In Fig. 1 I have shown a fragment of the cutter 10 having a plurality of involute teeth 11. The working faces of the teeth of the cutter are provided with serrations, which, as shown in this figure, extend straight up the faces of the teeth, but which may be diagonal or otherwise disposed. These serrations are of substantial depth and permit repeated regrinding of the cutter during its useful life. Channels 13 are provided at the roots of the teeth for facilitating chip removal.

While I have illustrated in Fig. 1 a gear cutting or shaving tool, it will be understood that the present invention is equally applicable to lapping tools, burnishing tools, and the like.

Figure 2:
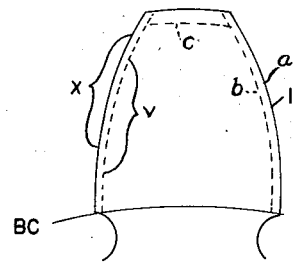
Fig. 2 is a diagrammatic view illustrating the specific difference between my improved cutter and the conventional cutter.

In Fig. 2 I have illustrated diagrammatically a single tooth 11. It is assumed in this figure that the tooth shown in full line outline is adapted to mesh with a work gear at the nominal pressure angle of the work gear. For example, if the nominal pressure angle of the work gear is relatively large, as for example 22½°, the tooth 11 is of such dimensions and gear characteristics that it will engage the work gear at an operating pressure angle of 22½°. I have discovered that a tool having teeth of these characteristics will not produce an accurate unmodified involute profile on the work gear.

In dotted lines I have indicated the modification necessary to render a tooth of these characteristics suitable to accurately finish involute profiles on the teeth of the work gear.

It is to be understood that the profiles $a$ of the tooth are involute curves generated from base circle BC. If this tooth is reduced in thickness so that its profile becomes the dotted lines $b$, the tooth will accurately finish involute profiles on the teeth of the work gear. The profiles $b$ are involutes generated from the same base circle but are closer together, as is evident in the figure, so that the tooth is substantially reduced in thickness relative to the base circle. At the same time it is necessary to reduce the outside diameter of the tool to avoid interference, and this is done by removing material to the line $c$ at the ends of the teeth.

Figure 3:
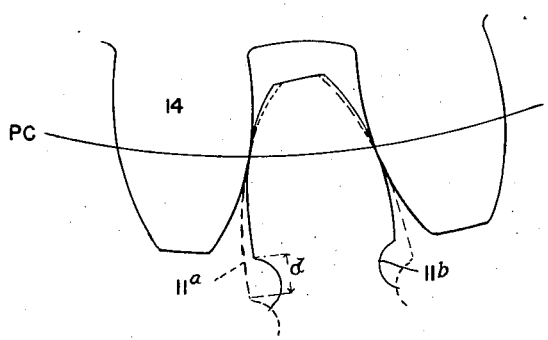
Fig. 3 is a diagrammatic view illustrating the meshing engagement of a gear and cutter.

In order to more fully understand the modification of the cutter, I have illustrated in Fig. 3 a work gear having teeth 14. In dotted lines at 11a I have illustrated a tooth of a gear finishing tool adapted to engage the teeth 14 of the work gear such that the gear and tool have an operating pressure angle substantially equal to the nominal pressure angle of the gear to be cut.

It will be understood that in conventional practice, since it was recognized that the gear finishing tools were to be reground, it was customary to add additional outside diameter and tooth thickness to the teeth of the tool in order to provide material for resharpening of the tool. It was the original aim to provide the teeth of the tool with characteristics such that the average operating pressure angle, or the operating pressure angle, when the tool was substantially half expended, would be equal to the nominal pressure angle of the gear to be cut.

As opposed to this, according to the present invention, the gear tooth 11a is modified by reducing its tooth thickness in outside diameter so that its dimensions are as illustrated in Fig. 3. It will be understood that by reducing tooth thickness of the tool, it is necessary to reduce the center distances of the tool and work piece in order to retain the parts in tight mesh. The tooth 11b is therefore illustrated as moved inwardly between the teeth 14 a distance shown in this figure as $d$. An inspection of this figure illustrates clearly that the operating pressure angle of the modified tool tooth is substantially less than the operating pressure of the conventional tool tooth. It will be understood that in the event that a gear to be finished has a nominal pressure angle which is relatively small, as for example 12½°, the opposite modification is made on the tooth of the tool; that is, the outside diameter of the tool is increased and the teeth of the tool are substantially thicker relative to the base circle.

It is further to be understood that the foregoing description is made for the purpose of illustrating the specific difference of the teeth of the tools embodying the present invention over the teeth of tools known to the art prior to my invention. In practice tools are designed and manufactured to give the desired operating pressure angle as manufactured rather than by modification of a conventional gear.

In Figure 4 I have illustrated diagrammatically some of the principles involved.

The base circle of a tool is designated BC³. As will be evident teeth of widely different chacteristics may be formed having profiles generated as involutes from the base circle, some of which are shown.

For purposes of illustration it is assumed that a tool provided with teeth having profiles such as 20 will mesh with a high nominal pressure angle gear (such as 22½°) at an operating pressure angle of about 22½°. According to prior practices, a tool designed for such a gear would have teeth similar to teeth 20.

According to the present invention however, the tool is designed to have teeth such as 30ᵃ when in new condition. It will be noted that teeth 30ᵃ are thinner than teeth 20 when measured at a predetermined distance from the base circle.

During its life the tooth 30ᵃ may be reground, each regrinding resulting in making the tooth thinner, and as will be subsequently be elaborated, resulting in a reduction in operating pressure angle with a specific gear or set of gears.

In Figure 4 I have indicated at PC' the pitch circle of a tool having teeth 20 generated from base circle BC³, when meshed with a specific gear. The operating pressure angle for such a tooth is indicated at *l*. A tool having teeth 30ᵃ, when meshed with the same gear, has an operating pitch circle PC², and an operating pressure angle *m*. As the tool is reground so that the teeth successively become teeth 30ᵇ and 30ᶜ, the operating pitch circles, when meshed with the same gear, become successively PC³ and PC⁴, and the operating pressure angles become *n* and *o* respectively.

Thus, according to the present invention, the tool is initially designed, for high nominal pressure angle gears, such that it meshes when new at a reduced operating pressure angle. Regrinds in use result in a further reduction in operating pressure angle. Note in Figure 4 that the reduction in operating pressure angle is accompanied by a corresponding movement of the operating pitch circle closer to the base circle.

In like manner, Figure 4 illustrates the relationship of a tool designed for relatively low nominal pressure angle gears (such as 12½°). A tool having base circle BC may have teeth indicated at 20', which are adapted, according to prior conventional practice, to mesh with the gear at an operating pressure angle of about 12½°. The operating pressure angle *p* for this arrangement corresponds to an operating pitch circle PC⁵, which, as is evident, is low on the tooth and relatively close to the base circle. According to the present invention, the tool is designed for use with this low nominal pressure angle gear, such as to have teeth when in new condition corresponding to teeth 30ᵃ. Regrinding in use results in the teeth successively appearing as 30ᵇ and 30ᶜ. Thus according to the present invention, the tool is initially designed, for low nominal pressure angle gears, such that it meshes when new at an increased operating pressure angle. Regrinds in use result in a reduction in operating pressure angle.

In accordance with the foregoing, the tool is made to mesh throughout its useful life at an operating pressure angle which changes downwardly upon regrinding between limits of 19°–12°. Preferably when new the operating pressure angle is between 19°–15°, about 18° having proved satisfactory in use.

In order to obtain the full benefits of the present invention, it is necessary to make compensating adjustments in the crossed axes setting of the gear and my improved tool. A gear and tool having a nominal helix angle difference of 15° will mesh properly with their axes crossed at 15° only at one particular center distance. When the center distance is changed due to initial design of a tool to produce an operating pressure angle different from the nominal pressure angle of the gear, a change in crossed axis setting is necessary. This is slight, but if not made will introduce serious errors in helix angle of a finished gear. The amount of change will depend upon the gear characteristics of both the tool and gear. It may be computed but in practice satisfactory adjustments may be made by test.

As the gear finishing tool is resharpened in use, the operating pressure angle is further reduced as will be evident.

In the event that when the nominal operating pressure angle of the gear to be cut is relatively small, as for example 12½°, the converse takes place; that is, a cutter or finishing tool is provided having teeth substantially thicker relative to the base circle than the teeth of a conventional tool. This results in separation of the base circles and an increase of operating pressure angle to within the range found necessary according to the present invention.

It is to be understood that in all cases when it is necessary to increase or decrease tooth thickness, that the profile of the tooth of the tool is unchanged and is involute for a rotary cutter. However, a different portion of the involute is used. Thus in Figure 2 the portion of the involute indicated at *x* would be used when operating at the nominal pressure angle. When the tooth has the characteristics pointed out as desirable in the present invention, a portion *v* substantially nearer the base circle, is used. In like manner, when selecting a proper tool for low nominal pressure angle gears, a portion of the involute further removed from the base circle is used than would be used if the gear and tool meshed at an operating pressure angle about equal to the nominal pressure angle.

Attention is particularly directed to the fact that this invention is possible only because of the peculiar characteristics of involute gears properly meshing at adjustable center distances depending upon relative tooth thicknesses.

By my invention I am able to manufacture gear finishing tools having teeth provided with unmodified involute profiles and to finish a work gear such that its profile is an unmodified involute. Further by designing my gear finishing tools with an initial operating pressure angle, as specified, I am enabled to accurately finish the teeth of the work gear to an unmodified involute within requirements of close tolerance throughout the entire useful life of my gear finishing tools.

It will further be appreciated that important economies result from this method, since machines are available for grinding accurate unmodified involute profiles on cutter teeth. Furthermore, the use of modified profile teeth does not reproduce theoretically perfect involutes, but merely reduces the error to values which are small enough to be disregarded.

The foregoing detailed description has been given for clearness and understanding only, and no unnecessary limitation should be understood therefrom, but the appended claims should be construed as broadly as permissible in view of the prior art.

What I claim as my invention is:

1. The method of finishing a series of like gears having a nominal pressure angle either substantially greater than 19° or substantially less than 15°, which comprises running said gears in mesh at crossed axes with a gearlike tool adapted when new to mesh tightly with said gears at a center distance such that the operating pressure angle is between 15° and 19°.

2. The method of finishing a series of like gears having a nominal pressure angle either substantially greater than 19° or substantially less than 15°, which comprises running said gears in mesh at crossed axes with a gearlike tool adapted when new to mesh tightly with said gears at a center distance such that the operating pressure angle is between 15° and 19°, periodically resharpening said tool, and discontinuing usage of said tool when the operating pressure angle with said gears is reduced to about 12°.

3. The method of finishing a series of like gears having a nominal pressure angle either substantially greater or less than 18°, which comprises running said gears in mesh at crossed axes with a gearlike tool adapted when new to mesh tightly with said gears at a center distance such that the operating pressure angle is about 18°.

4. The method of finishing a series of like gears having a nominal pressure angle of about 20° or over, which comprises running them in mesh at crossed axes with a gearlike tool adapted when new to mesh tightly with said gears at an operating pressure angle of between 19° and 15°.

5. The method of finishing a series of like gears having a nominal pressure angle of about 14½° or less, which comprises running them in mesh at crossed axes with a gearlike tool adapted when new to mesh tightly with said gears at an operating pressure angle of between 19° and 15°.

6. The method of finishing a series of like gears having a nominal pressure angle of about 20° or over, which comprises running them in mesh at crossed axes with a gearlike tool adapted when new to mesh tightly with said gears at an operating pressure angle of about 18°.

7. The method of finishing a series of like gears having a nominal pressure angle of about 14½° or less, which comprises running them in mesh at crossed axes with a gearlike tool adapted when new to mesh tightly with said gears at an operating pressure angle of about 18°.

MAX B. MENTLEY.